United States Patent
Stoakes et al.

(10) Patent No.: US 8,983,916 B2
(45) Date of Patent: Mar. 17, 2015

(54) CONFIGURABLE DATA GENERATOR

(76) Inventors: Timothy Stoakes, Humburg Scrub (AU); Craig Edward Jones, Maslin Beach (AU)

(*) Notice: Subject to any disclaimer, the term of this patent is extended or adjusted under 35 U.S.C. 154(b) by 129 days.

(21) Appl. No.: 13/524,450

(22) Filed: Jun. 15, 2012

(65) Prior Publication Data

US 2013/0339315 A1 Dec. 19, 2013

(51) Int. Cl.
*G06F 17/30* (2006.01)
*G06F 3/06* (2006.01)

(52) U.S. Cl.
CPC ............ *G06F 3/0641* (2013.01); *G06F 3/0683* (2013.01); *G06F 3/0608* (2013.01)
USPC ............................ 707/692; 707/654; 714/752

(58) Field of Classification Search
CPC ....... G06F 9/44; G06F 3/0641; G06F 3/0608; G06F 3/0683
USPC ........................................................ 707/692
See application file for complete search history.

(56) References Cited

U.S. PATENT DOCUMENTS

| | | | |
|---|---|---|---|
| 8,074,043 B1* | 12/2011 | Zeis | 711/171 |
| 2001/0021254 A1* | 9/2001 | Furuya et al. | 380/259 |
| 2010/0037118 A1* | 2/2010 | Saliba et al. | 714/752 |
| 2012/0197958 A1* | 8/2012 | Nightingale et al. | 709/201 |
| 2013/0042083 A1* | 2/2013 | Mutalik et al. | 711/162 |
| 2013/0086006 A1* | 4/2013 | Colgrove et al. | 707/692 |

* cited by examiner

*Primary Examiner* — Wei Zhen
*Assistant Examiner* — Mohammed Huda (57) ABSTRACT

Embodiments associated with configurable, repeatable, data generation are described. One example method includes manipulating a redundancy parameter that controls data redundancy in binary large objects (BLOBs) to be included in a generated data set. The redundancy parameters may control variations in repeatable variable length sequences included in BLOBs. The example method also includes manipulating a parameter(s) that controls custom designed sequences included in BLOBs. With the redundancy and custom designed sequences described, the example method then generates BLOBs based, at least in part, on the redundancy parameters and the custom-designed sequences. BLOBs may include byte sequences repeated at different frequencies and configurable user-designed sequences. Manipulating the redundancy parameter, manipulating the custom-designed sequences, generating the BLOBs, and providing the BLOBS may be performed by separate processes acting in parallel.

7 Claims, 6 Drawing Sheets

CONFIGURABLE DATA GENERATOR

BACKGROUND

The performance of a data de-duplication apparatus or method may be sensitive to the data being de-duplicated. For example, redundancy elimination, compressibility, application specific metadata filtering, and service time may depend on attributes of the data being de-duplicated. The attributes may include patterns of repeating elements, compressibility, internal redundancy, and external redundancy. Data being de-duplicated may be highly variable in terms of its short term patterns, long term patterns, redundancy characteristics, and compressibility characteristics. Therefore, to facilitate testing a de-duplicator and to facilitate examining data de-duplication performance, attempts have been made to make test data available that varies in a systematic way. However, these conventional attempts may have produced fixed data sets that could not be presented to a de-duplicator in a meaningful time frame.

Test data lacking redundant components may have limited use for evaluating performance. Similarly, test data that cannot be reproduced on demand may also have limited use for evaluating or bench-marking performance. Typical approaches included creating and then storing a test data set. The data set would then be retrieved from long term storage (e.g., disk, tape) and provided to the de-duplicator being tested. However, creating a data set with desired redundant components and then storing that data set for multiple presentations typically consumed an undesired amount of storage space, particularly when multiple test data sets having multiple redundancy characteristics and multiple different configurable customizable patterns were created and stored. Recall that data de-duplication seeks to reduce the amount of data being stored and therefore storing multiple test data sets may be contrary to the goals of de-duplication.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Theoretically there is a potentially infinite data space available for data de-duplication. However, using only a suitable subset of this potentially infinite data space may be desired for meaningful testing or other purposes. A suitable subset may include a distribution of data where some data compresses and some data doesn't, and where some data is unique and other data is not unique. For meaningful de-duplication testing, it may be desired to generate data that has configurable and recognizable patterns, that has configurable redundancy attributes, and that can be selectively produced in a repeatable on-demand manner without having to be stored. Additionally, it may be desired to produce and provide this data at a rate sufficient to stress a data de-duplication apparatus or process. While test data and testing are described throughout this application, one skilled in the art will appreciate that more generally data may be generated for purposes other than just testing.

Example apparatus, methods, and other embodiments concern a configurable data generator. In different examples, the generator may be an apparatus, a circuit, a process, or a programmed processor. The configurable data generator facilitates repeatedly generating configurable data that contains configurable patterns of repeatable elements. In one embodiment, the repeatable elements may appear with various configurable frequencies. Example apparatus, methods, and other embodiments facilitate faithfully recreating realistic use-case scenarios. In one embodiment, the data may include a number of binary large objects (BLOBs) that are created with customizable redundancy patterns. The BLOBs may include one or more blocks, files, or other arrangements of data. In one embodiment, fragmentation of redundancy patterns can be configured to control how a conserved redundant region is dispersed over a number of BLOBs. Fragmentation can be manipulated by placing components that repeat in different numbers of BLOBs. Fragmentation can also be manipulated by altering the variation of fragmenting elements.

Figure 1:
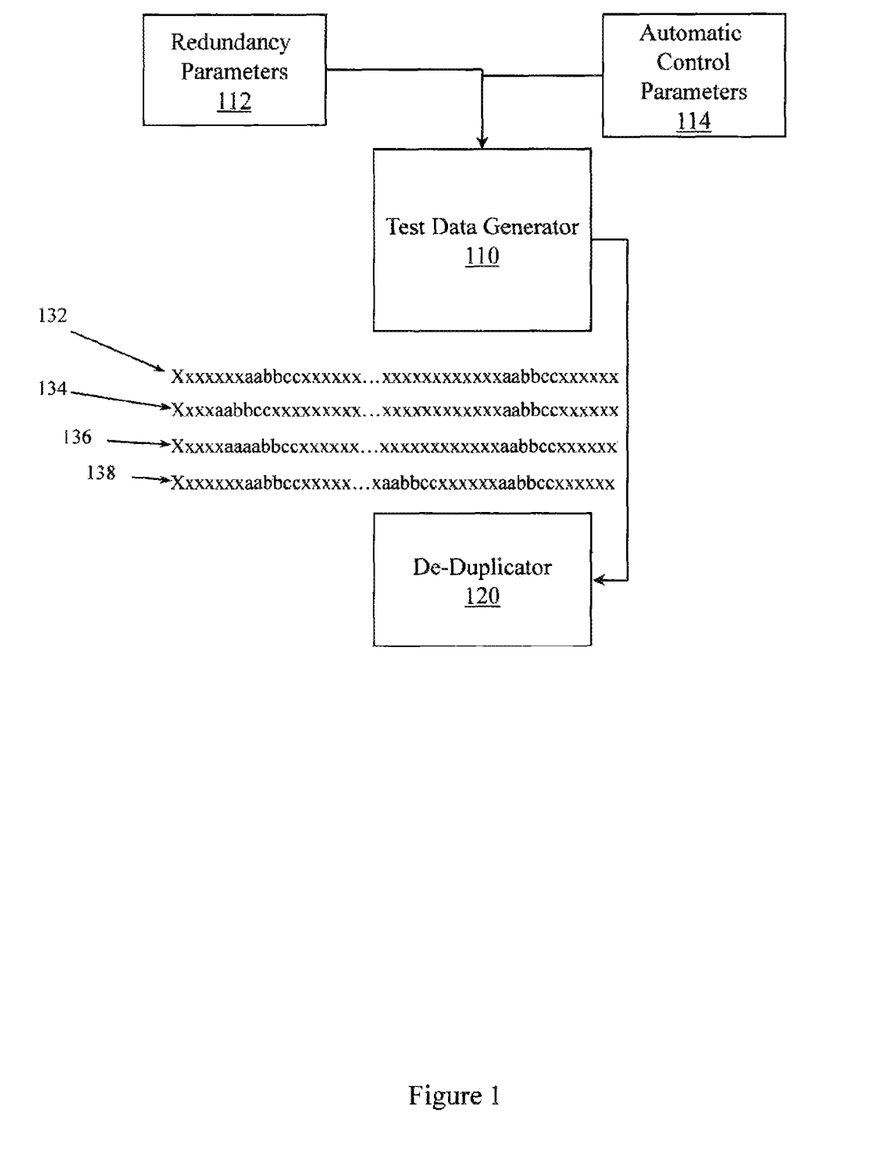
FIG. 1 illustrates an example test environment.

FIG. 1 illustrates an example testing environment. A test data generator 110 will provide test data to a de-duplicator 120 that is to be tested. The data that is produced by test data generator 110 conforms to attributes controlled by automatic control parameters 112 and custom parameters 114. In one example, test data generator 110 may produce binary large objects (BLOBs) (e.g., BLOB 132, BLOB 134, BLOB 136, and BLOB 138). In the BLOBs, an x represents a piece of random data. Notice that the BLOBs contain a customized repeating sequence aabbcc. In BLOB 136 the customized repeating sequence has been varied to aaaabbcc. Example apparatus, methods, and other embodiments described herein facilitate creating and providing a data set that includes configurably random data with configurable user-designed sequences. The configurably random data may be produced automatically while the configurable user-designed sequences may involve human intervention or selection.

In one embodiment, test data may include redundant spans that are specified as random seed generated variable length patterns from within a possibly constrained number-space. Characteristics of the redundant spans may be controlled by redundancy metadata. Test data may also include custom-designed and/or user specified byte sequences. Characteristics of the custom-designed data may be controlled by custom-sequence metadata. The redundant spans and the custom-designed sequences are distinct entities that may be considered to be orthogonal concepts.

Example apparatus, methods, and other embodiments facilitate recreating user data scenarios with redundancy characteristics in test data that are similar to those observed in live user data without requiring capturing and storing an entire user data set. User data can be described by redundancy characteristics including, for example, redundancy elimination, and compressibility. Recreating redundancy characteristics that have been observed in user data may therefore involve producing varying numbers of BLOBs with various sizes and then distributing configurably varying repeatable components (e.g., customized byte sequences, customized bit sequences, customized patterns) in those BLOBs. The data set may be subdivided into subsets using, for example, BLOBs.

As described in the background, simply creating a test data set(s) and then storing the data set on disk may be impractical, especially when a large number of test data sets are desired. In addition to being impractical space-wise, acquiring and then providing a stored data set(s) may be impractical time-wise due to input/output (i/o) issues involved in retrieving the data set from a high capacity (e.g., disk, tape) storage system. Therefore, in one embodiment, data may be generated and provided directly to a de-duplicator without having been stored on an intermediary device (e.g., disk) and without having been retrieved from a long term storage device. In one embodiment, the data is generated in a circuit and provided directly (e.g., without being stored on disk) to a de-duplication appliance or process for ingest and processing. In another embodiment, the data is generated by a processor as controlled by a process and provided directly (e.g., without being stored on disk) to the de-duplication appliance or process. In one embodiment, while the data is being provided directly, the data may be buffered in, for example, a cache memory or buffer. In one embodiment, the speed at which data is generated and provided may be configurable to facilitate saturating a de-duplication appliance or process or to facilitate stressing a de-duplication appliance or process to within a desired percentage of saturation.

Example apparatus, methods, and other embodiments may be configured to automatically machine produce repeatable byte sequences and then to distribute those repeatable byte sequence in the other (e.g., random) data being generated. A repeatable byte-sequence may have a length, a pre determined minimum length setting, and a pre-determined maximum length setting. The lengths and minimums and maximums may be described using a size variant attribute(s) and thus the length may vary between the maximum and the minimum. In one embodiment, the variation in length may be controlled to produce a desired length distribution. Varying the byte sequence length may be referred to as "byte-sequence" variability.

Byte-sequence variability with BLOB dispersion is a useful tool for stressing a de-duplication appliance or process. Byte-sequence variability with BLOB dispersion can create intense i/o activity in a de-duplicator including, for example, open, seek, and sync requests. Additionally, byte-sequence variability with BLOB dispersion can lead to de-duplicator memory caches filling quickly. The combination of filled memory caches and intense i/o can stress a de-duplication process or appliance. The stress may be manifested by maximizing the time required to satisfy a request. The stress may lead to compromised disk utilization including increased space usage, increased fragmentation, and high i/o loads. It may be desirable to reproducibly create these types of stresses during testing.

Thus, varying byte-sequences may be useful for testing and stressing data de-duplication appliances or processes. While "byte-sequences" are described, other sequences (e.g., bit sequences, variable length character sequences, character sequences) may also be employed. The variable length byte sequences may be created using different configurable methods. In different examples, configurable byte sequences can be assembled from repeating bytes, symbols, or compressible byte patterns with varying degrees of compressibility. In one embodiment, variable length byte sequences can be designed to contain custom byte sequence patterns. Having custom patterns available in byte sequences facilitates creating test data for testing a de-duplication appliance or process in different custom scenarios. The custom scenarios may include, but are not limited to, a scenario where application specific metadata will be encountered, a scenario where zero-byte padded regions may be encountered, and a scenario where specific byte combinations may be encountered.

Application specific metadata may include, for example, headers and footers with both fixed and variable fields. The fixed portions may identify boundaries or other static information while the variable fields may identify items like time of day, length, and other items. Since application specific metadata is, by definition, specific to an application, its presence may be more or less relevant to de-duplication based on the amount of data associated with that application that is encountered by a de-duplicator. If a de-duplication apparatus or process will never encounter a certain type of application specific metadata, then it may not make sense to include that application specific metadata in test data. However, it may be desirable to present a de-duplication apparatus or process that is likely to encounter one or more types of application specific metadata with data that includes configurable amounts and types of application specific metadata. The ability to create and generate custom byte sequences facilitates providing application specific metadata.

Example apparatus, methods, and other embodiments may use both "populators" to control how data will be created and "writers" to generate and provide data. In a multi-threaded computing system, a populator may be a populator thread and a writer may be a writer thread. In an apparatus, a populator may be a first circuit and a writer may be a second circuit whose operation is controlled, at least in part, by the first circuit. In one embodiment, a populator may be a circuit and a writer may be a process while in another embodiment a populator may be a process and a writer may be a circuit.

A populator may determine the redundancy pattern for a BLOB or for multiple BLOBs. In one embodiment, a populator may establish or maintain file redundancy metadata to facilitate recreating a data set. The redundancy metadata may include, but is not limited to, a byte length for a spanning region in a BLOB, the degree of internal redundancy for a BLOB, the degree of external redundancy for a BLOB, and an identifier (e.g., seed value) for identifying the data set produced by the combination of redundancy metadata. In one embodiment, byte length may be controlled to follow a kurtosis rule so that the byte length distribution will follow a geometric frequency distribution. In one embodiment, the degree of kurtosis is a configurable parameter. The degree of kurtosis may control, for example, the uniformity of the span byte length distribution.

As used herein, "span" refers to a variable length sequence of bytes. A span may be non-redundant, may be internally redundant, and/or may be externally redundant. A non-redundant sequence span is a given byte-sequence that is found only once in a BLOB, Sequence spans generated by random sequence choice fall under this category. An internally redundant sequence span is a byte-sequence that may be found one or more times in a single BLOB, but is unique to that BLOB in a data set. Externally redundant sequence spans are present one or more times in one or more BLOBs. Due to the nature of de-duplication methods, externally redundant spans may test the dedupe component index capacity. Processing externally redundant spans may demonstrate rate dependent impacts of de-duplication including, for example, de-duplication rate. As sequences are selected by the data generation method, a state machine can determine when to select a span of a given redundancy class. This transition may be referred to as a redundancy state change. In one embodiment, the frequency of redundancy state changes may be a configurable parameter.

A populator determines the redundancy characteristics of a BLOB. Writers generate data and provide (e.g., write) data to a de-duplication apparatus or process. A writer is controlled, at least in part, by the redundancy metadata established or maintained by a populator. The redundancy metadata may also be referred to as automatic control metadata. A writer may, for example, access redundancy metadata for a BLOB, write sequences to a buffer, and then write the buffer to a BLOB. The spans may vary in length, content, and other attributes.

In one example where compression will be used on the generated data, a buffered sequence may be used as a list of keys into a symbol table. A sequence may be used as a key value for locating a symbol based on the compression technique being used. The symbols may have variable lengths and content. In this example, data is made from a set of repeatable symbols that are used to create the redundancy patterns for a BLOB. In one embodiment, the compressibility of the symbols can be a configurable parameter where a higher value may result in symbols being created with higher compressibility. For example, when the compression approach involves run-length encoding, a high compressibility parameter could yield longer single byte-value runs in symbols. In one embodiment, which compression technique is employed may itself be a configurable parameter.

In one embodiment, the populator may be a populator thread and the writer may be a writer thread. The threads may execute substantially simultaneously in a multi-threaded system. In one example there may be multiple populator threads. In another example there may be multiple writer threads. In yet another example, there may be multiple populator threads and multiple writer threads. In one embodiment, the number of threads available or active may itself be a configurable parameter. Having populator threads active at the same time as writer threads facilitates having redundancy parameter determination or maintenance occur concurrently with data generating and writing. Thus, redundancy characteristics can change on-the-fly without interrupting the generation of test data.

Having multiple threads available, and being able to configure the number of threads available facilitates configuring example apparatus or methods or other embodiments with respect to the degree to which they will saturate a data de-duplication apparatus or process.

Example apparatus, methods, and other embodiments are configured to facilitate producing repeatable data patterns. Therefore, in one embodiment, redundancy or automatic control metadata may include an identifier (e.g., seed value) that can control a data generator (e.g., random number generator) to produce a selected data pattern as a function of the identifier and other redundancy metadata. If the random number is primed with a first seed value at a first time then the random number generator will produce a first random sequence. If the random number generator is then primed with the same first seed value at a second, later time, then the random number generator will again produce the first random sequence. In one embodiment, a populator thread may be configured to control a data generator to advance to a known desired state after beginning at a selected state. In this embodiment, a populator thread may determine a redundancy parameter for an item (e.g., BLOB) and then the item may be generated but not written. This approach may be taken to advance a data generator to a point other than its starting point. Redundancy parameters for multiple items may be determined and multiple items (e.g., BLOBs) may be skipped (e.g., not written).

In one embodiment, a state to which a generator has advanced may be stored so that a section of the test data (e.g., BLOB, BLOBs, BLOB-segments) can be recreated without having to start at an initial state for the generator. In one embodiment, multiple threads may interact with a shared generator. In this embodiment, an identifier (e.g., seed value) provided by one populator will produce the same data generation as if provided by a different populator. Similarly, when multiple populators are interacting with a shared generator (e.g., random number generator), the state to which the generator has advanced may be available to the multiple populators.

The following includes definitions of selected terms employed herein. The definitions include various examples or forms of components that fall within the scope of a term and that may be used for implementation. The examples are not intended to be limiting. Both singular and plural forms of terms may be within the definitions.

ASIC: application specific integrated circuit.
CD: compact disk.
CD-R: CD recordable.
CD-RW: CD rewriteable.
DVD: digital versatile disk or digital video disk.
I/O: input/output
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
USB: universal serial bus.

References to "one embodiment", "an embodiment", "one example", "an example", and other similar references, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof), Computer components may include, for example, a process running on a processor, a processor, an object, an executable, a thread of execution, and a computer. A computer component(s) may reside within a process or thread. A computer component may be localized on one computer or may be distributed between multiple computers.

"Computer-readable medium", as used herein, refers to a non-transitory medium that stores signals, instructions or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical or logical entity that can store data. A data store may be, for example, a database, a table, a file, a data structure (e.g. a list, a queue, a heap, a tree) a memory, a register, and other storage item. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other items. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, a bit stream, and other items that can be received, transmitted or detected.

"Software", as used herein, includes but is not limited to, one or more executable instructions that cause a computer, processor, or other electronic device to perform functions, actions or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic. The physical manipulations create a concrete, tangible, useful, real-world result.

It has proven convenient at times, principally for reasons of common usage, to refer to these signals as bits, values, elements, symbols, characters, terms, and numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 2:
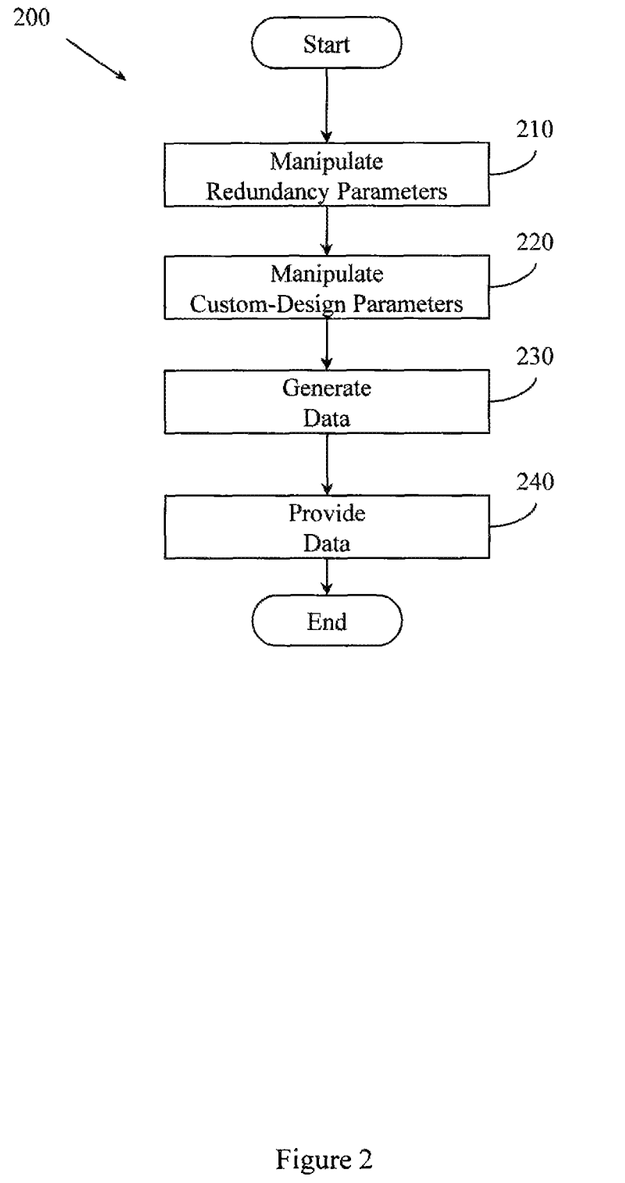
FIG. 2 illustrates an example method associated with generating data.

FIG. 2 illustrates a method 200 for producing data. In one example, the data may be test data. Method 200 includes, at 210, manipulating a redundancy parameter or parameters that control redundancy in the data to be generated automatically. Controlling redundancy in the test data can include controlling how much data in the data set is repeated data and how much data in the data set is unique data. Controlling the redundancy can also include controlling the presence (e.g., amount, size, frequency, position) of user defined sequences in the data set. Manipulating the redundancy parameters may include manipulating a seed value for a random number generator. The random number generator may be, for example, a pseudo-random number generator. The seed value can control a beginning point for the random number generator. When presented with the same seed value, the random number generator may produce the same random sequence.

Manipulating the redundancy parameters can also include manipulating a degree of internal redundancy for a subset of the test data, and manipulating a degree of external redundancy between subsets (e.g., BLOBs) of the test data. The internal redundancy describes how much data is duplicated within an item (e.g., BLOB). The external redundancy describes how much data in a first item is duplicated in a second item. It may be desired to have the internal and external redundancies vary in a test data set. Therefore, in one example, manipulating the redundancy parameters can include describing a frequency with which internal redundancy is to vary and a frequency with which external redundancy is to vary. For example, internal or external redundancy may have a first setting for a first number of items (e.g., BLOBs) and then a second setting for a second number of items. The frequency may be fixed or may vary according to a distribution.

It may be desired to generate different data sets with different sizes. Therefore manipulating the redundancy parameters at 210 can also include controlling the number of subsets of test data to be generated, controlling a maximum subset size, controlling a minimum subset size, controlling a subset size variability, and controlling a subset size distribution. The overall size can be controlled by controlling the size of the subsets and the number of the subsets. In different examples the subsets may be BLOBs, files, spans, or other collections of data.

It may also be desired to be able to control whether test data can be compressed. Some data de-duplicators will encounter compressed data and some data de-duplicators will not. Additionally, a data de-duplicator may encounter compressed data when processing data from one source but may not encounter compressed data when processing data from another source. Therefore manipulating the redundancy parameters can include controlling a degree of compressibility for the data set and controlling a compression type to be employed to compress compressible data. Being able to control the compression type facilitates recreating relevant use cases for testing. For example, if a data de-duplicator will encounter data compressed using run-length encoding, then manipulating the parameters may include setting a compression flag to cause a run-length encoder to run-length encode a configurable amount of the test data. Similarly, if a data de-duplicator will encounter data compressed using a Lempel-Ziv (LZ) approach, then manipulating the parameters may include setting the compression to cause an LZ encoder to LZ encode a configurable amount of the test data.

Manipulating the redundancy parameters can also include manipulating the number of random number seed values that are possible values for a given redundant span. By way of illustration, if internal redundancy is low, perhaps only two seed values will be available for the random number generator when the internal redundant span state is selected during data generation. By way of further illustration, if internal redundancy is higher, then the number of seed values available for the random number generator may be higher. Different seed values indicate a possible unique byte sequence. Additionally, the length of different instances of a redundant span may vary based, for example, on a geometric size distribution.

Method 200 also includes, at 220, manipulating a parameter or parameters associated with custom-designed or user-provided sequences that may be added to the data whose production is controlled by the redundancy data. These parameters may control attributes in custom-designed sequences to be included in the test data to be generated. In one example, manipulating a custom parameter includes identifying a custom sequence to be generated. Identifying the custom sequence can include identifying a character or characters to appear in the custom sequence, or identifying a bit, byte, or other symbol to appear in the custom sequence. Identifying the custom sequence can also include controlling a minimum custom sequence length, a maximum custom sequence length, and a sequence length distribution. Length and length variation is just one way in which a custom sequence can vary. Thus, manipulating the variability parameter can also include controlling a degree by which the custom designed sequences will vary, a degree by which the one or more custom designed sequences will be fragmented, and a degree by which the one or more custom designed sequences will be dispersed between subsets of the test data. Thus, how frequently a custom designed sequence will appear can be controlled, as can how long the custom designed sequence will be and how widely or closely spaced through the data set the custom designed sequences will appear.

Different custom designed sequences can be generated by different methods. In one example, a generator can be provided with a seed value, a length, and a character set from which the sequence will be generated. Different generators can include, but are not limited to, a random generator, a pseudo-random number generator, a hash function, and an encoder. Note that custom designed sequences or user-specified sequences are different from the internally and/or externally redundant spans that are generated using, for example, a pseudo-random number generator. For example, custom designed sequences can be specified in some non-random, configurable, and/or controllable way. A custom designed sequence may then be inserted into a span-stream that was generated using, for example, the pseudo-random number generator based approach. Recall that the internally and externally redundant spans may be determined by, for example, the redundancy parameters.

While single custom sequences are described, in some examples pairs or larger sets of related custom sequences may be generated. Consider a data set that includes headers and footers that bracket a data element. Or consider a data set that includes records that have headers, footers, and intermediate separators. In these examples, the placement of a footer may depend, at least in part, on the existence and location of a header. Therefore, the two related custom sequences may be treated as a pair of related sequences rather than as independent sequences. Additionally, example methods and apparatus may process some data that appears within the related custom sequences. For example, a sequence number may be chosen for a header, and it may be desirable to place the same sequence number in the corresponding footer. In another example, data found in the header or footer may depend, at least in part, on data bracketed by the header and footer. For example, the header may include a length of the sequence and the footer may include a checksum for the sequence.

Method 200 also includes, at 230, generating the data based, at least in part, on the redundancy parameters. The data that is generated will include one or more variable custom-designed sequences whose properties are controlled, at least in part, by the parameters that control custom-designed sequences.

Method 200 also includes, at 240, providing the data from the computer to a data de-duplicator. In one example, providing the data from the computer to the data de-duplicator includes temporarily storing a portion of the data in a memory-based buffer in the computer. The memory-based buffer may be, for example, a cache buffer, a RAM buffer, or other buffer. The memory-based buffer is not a disk or tape-based buffer. In one embodiment, the data is not acquired from a long term storage device (e.g., disk, tape) and is not stored on a long term storage device (e.g., disk, tape). Instead, the data is generated from an apparatus, circuit, process, or thread and provided directly to the data de-duplicator, possibly resting momentarily in a memory (e.g., RAM) buffer. In another example, data may be stored, wholly or in part, to a long term storage device.

In one example, method 200 is performed in a multi-threaded system. Thus, in one example, manipulating the redundancy parameters at 210, manipulating the parameters that control custom-designed sequences at 220, generating the data at 230, and providing the data at 240 are performed by separate processes or threads acting at least partially in parallel on the computer. When performed in a multi-threaded system, manipulating the redundancy parameters and manipulating the parameters that affect custom-designed sequences may be performed by a configurable number of populator threads. Additionally, generating the data may be performed by one or more writer threads. In this example, the populator threads and the writer threads may be configured to operate in parallel in the multi-threaded system. Additionally, in one example, the method 200 may include controlling the number of populator threads used to perform the method, and controlling the number of writer threads used to perform the method. By way of illustration, a first data de-duplicator may only need to be tested at a first slower rate, and thus a single populator thread and a single writer thread may be able to provide sufficient data to satisfy the first slower rate. However, a second data de-duplicator may need to be tested at a second faster rate, and thus two or more populator threads and two or more writer threads may be necessary to provide sufficient data to satisfy the second higher rate.

In one example, populator threads may share a common data generator. The common data generator may be, for example, a random number generator, a checksum generator, and a hash generator.

While FIG. 2 illustrates various actions occurring in serial, it is to be appreciated that various actions illustrated in FIG. 2 could occur substantially in parallel. By way of illustration, a first process could configure redundancy parameters, a second process could manipulate parameters that affect custom-designed sequences, a third process could generate data, and a fourth process could provide data. While four processes are described, it is to be appreciated that a greater or lesser number of processes could be employed and that lightweight processes, regular processes, threads, and other approaches could be employed.

Figure 3:
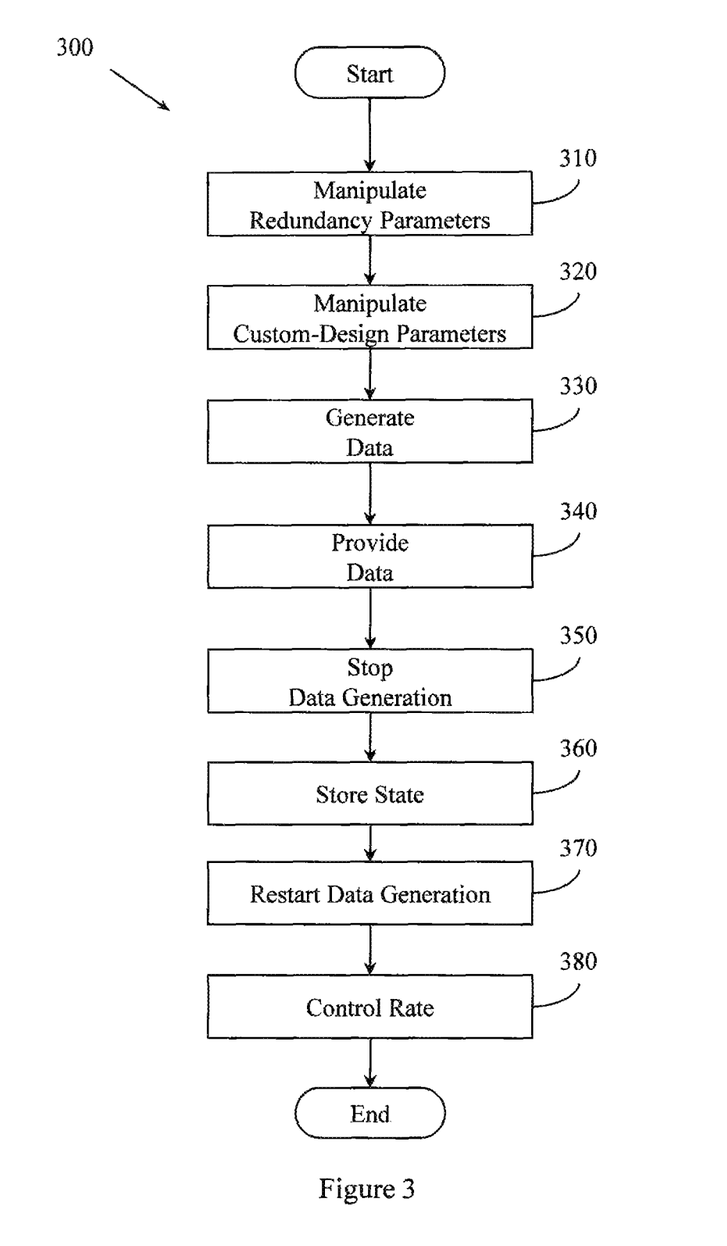
FIG. 3 illustrates an example method associated with generating data.

FIG. 3 illustrates a method 300. Method 300 includes several actions similar to those in method 200 (FIG. 2). For example, method 300 includes manipulating redundancy parameters at 310, manipulating parameters that affect custom-designed sequences at 320, generating data at 330, and providing data at 340. However, method 300 also includes additional actions.

In one example, method 300 may include, at 350, stopping data generation by the common data generator and then, at 360, storing a state to which the common data generator advanced while generating data. With the state stored, method 300 may continue, at a later time, at 370, by restarting data generation by the common data generator at a point controlled by the state. Being able to stop the generator at a known point and then restart the generator at that point facilitates producing different random data sets with the same redundancy and custom-designed parameters.

Method 300 may also include, at 380, selectively controlling the rate at which the data is provided to the data de-duplicator. In one example, the rate is configurable up to a rate that will saturate the data de-duplicator. In one embodiment, a surplus number of populator threads and writer threads can produce a surplus amount of data, some of which can be discarded without being provided to the data de-duplicator.

Figure 4:
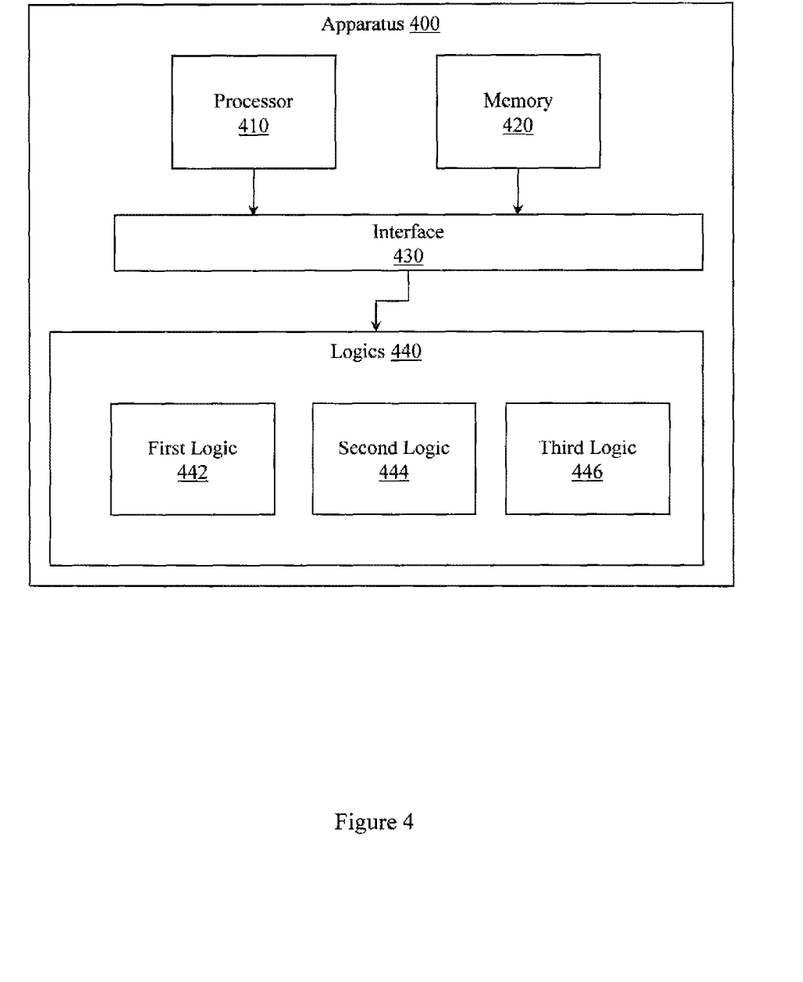
FIG. 4 illustrates an example apparatus associated with generating data.

FIG. 4 illustrates an apparatus 400. Apparatus 400 includes a processor 410, a memory 420, a set 440 of logics, and an interface 430 to connect the processor 410, the memory 420, and the set 440 of logics. The set 440 of logics may include a first logic 442, a second logic 444, and a third logic 446.

In one example, first logic 442 is configured to maintain redundancy metadata that determines redundancy characteristics (e.g., a redundancy pattern) in a data set to be produced by the apparatus 400. In one example, the first logic 432 is configured to determine the redundancy pattern according to a desired redundancy distribution. The redundancy metadata may describe attributes including, but not limited to, a binary large object (BLOB) length distribution, a data redundancy degree, a redundancy variability distribution, and a redundancy state change frequency. The redundancy degree describes how redundant the data is. This means the redundancy degree describes how much of the data is unique and how much of the data is not unique. The unique data may not be de-duplicated out of the data set by the de-duplicator while the redundant data may be de-duplicated out by the de-duplicator. The redundancy variability describes how different the redundancy is in one part of the data set as compared to another part of the data set. For example, one BLOB may be mostly redundant data while another BLOB is mostly unique data, Redundancy state change frequency describes how often the redundancy degree changes during data generation. In one example, the first logic 442 may be configured to maintain redundancy data that includes application specific metadata.

In one example, second logic 444 is configured to maintain metadata that determines characteristics of a user-defined data sequence to appear in the data set. This user sequence metadata may describe attributes including, but not limited to, a user defined data sequence, a use defined sequence length distribution, and a ratio describing how much of the data set is associated with user defined data sequences and how much of the data set is associated with non-user defined data. Since the variability data is associated with user defined data sequences, the variability metadata may also describe items including, but not limited to, a bit sequence to be included in a user defined sequence, a repeating byte to be included in a user defined sequence, a byte sequence to be included in a user defined sequence, a repeating character to be included in a user defined sequence, a character sequence to be included in a user defined sequence, a repeating variable length symbol to be included in a user defined sequence, and a variable length symbol sequence to be included in a user defined sequence. By way of illustration, a data set may include random data denoted by the character "x" in the example below, and may include a user defined sequence (e.g., aabbcc):

xxxxxxxxxaabbccxxxxxxxxxxxxxxxxxxxxxxxxxxxxx

In the example above, there is primarily random data. In the next example, the ratio of random data to user defined sequence is lower:

xxxxxxxxxaabbccxxxxxxxxxxxxx-aabbccxxxxxxxxxxxxxxaabbccxxxxx

In the next example, the ratio is also affected by variability in the user defined sequence:

xxxxaaaaaaabcccccxxxxxxx-aaaaabbbbbbbbbccccccccxxxxaaabbbcccxxx

In one example, third logic 446 is configured to produce the data set as controlled by the redundancy metadata and the user sequence metadata. The data set that is produced by apparatus 400 will exhibit the redundancy pattern and will include one or more instances of the user-defined data sequence. As illustrated above, in one embodiment the user defined sequence may be fixed while in another embodiment the user defined sequence can vary. In one example, the third logic 436 may be configured to buffer an element of the data set in a memory of the apparatus 400.

In one example, the first logic 442, the second logic 444, and the third logic 446 are configured to operate in parallel. Additionally, the first logic 442, the second logic 444, and the third logic 446 may be configured to control threads that operate in parallel. In one example, the first logic 442 may be configured to control a plurality of redundancy threads to maintain the redundancy data, where the plurality of redundancy threads operate in parallel. Similarly, the second logic 444 may be configured to control a plurality of user sequence threads to maintain the user sequence data, where the plurality of threads operate in parallel. Additionally, the third logic 446 may be configured to control a plurality of production threads to produce elements of the data set, where the plurality of production threads operate in parallel.

Figure 5:
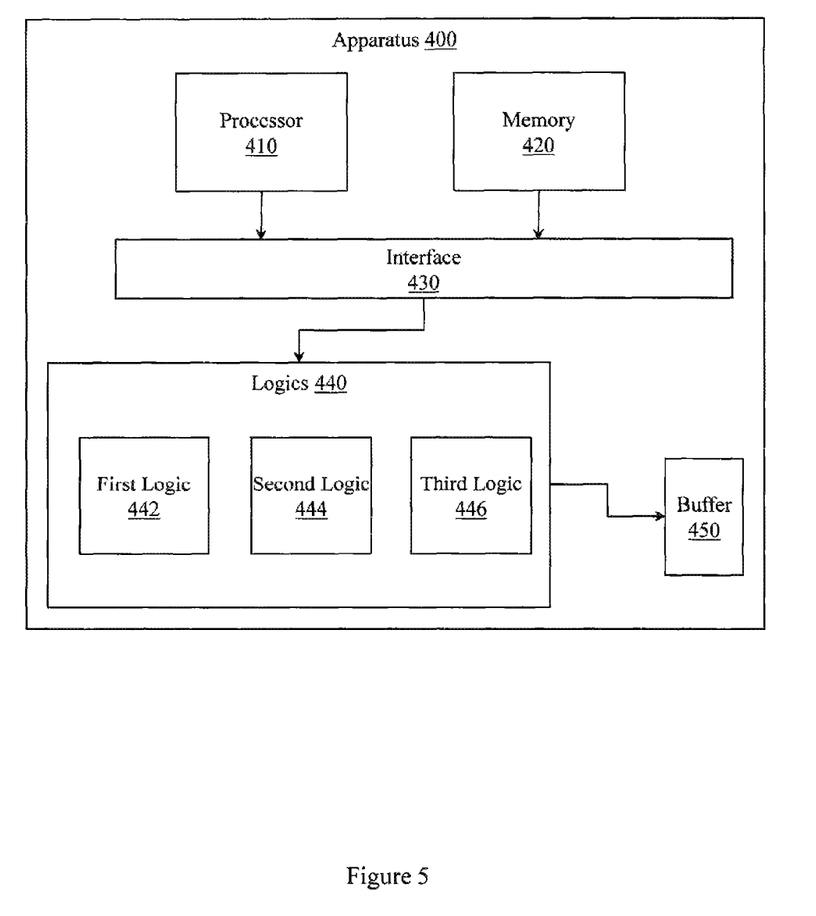
FIG. 5 illustrates an example apparatus associated with generating data.

FIG. 5 illustrates another embodiment of apparatus 400. This embodiment of apparatus 400 includes a buffer 450. Buffer 450 may be, for example, random access memory (RAM) or some other memory in apparatus 400. Data produced by the set 440 of logics may temporarily be buffered in buffer 450 but may not be stored in a long term storage device like a disk or tape.

Figure 6:
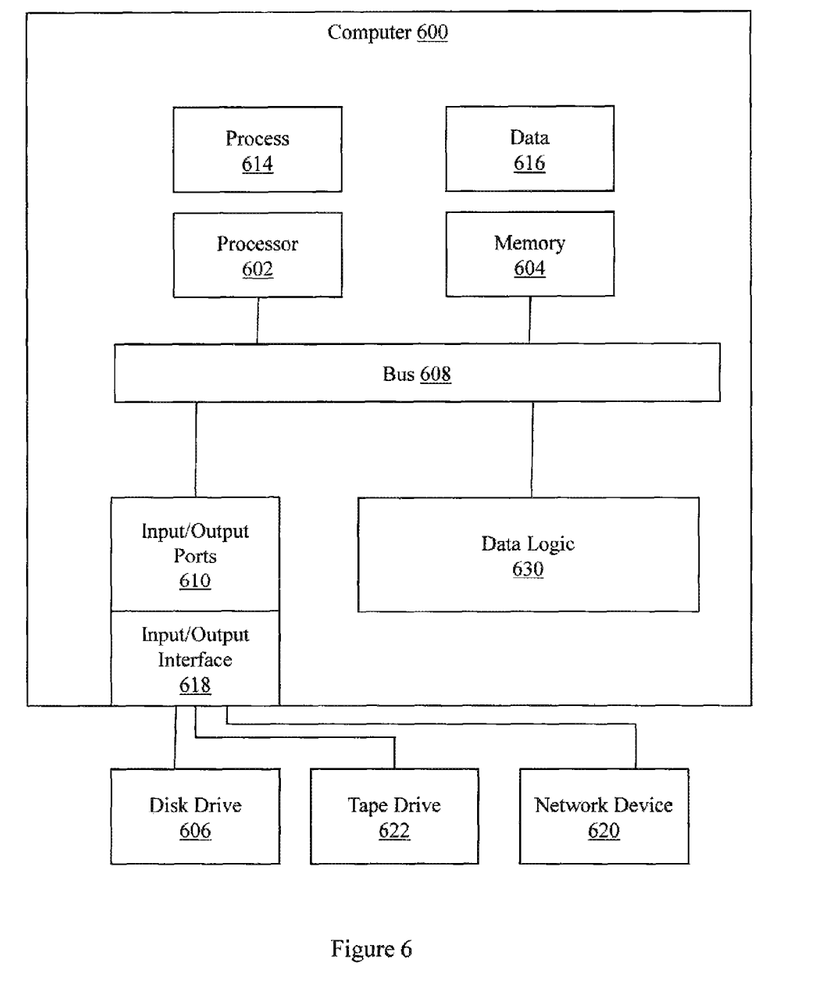
FIG. 6 illustrates an example computing environment in which example apparatus, systems, methods, and equivalents, may operate.

FIG. 6 illustrates an example computing device in which example apparatus, methods, and other embodiments described herein and equivalents, may operate. The example computing device may be a computer 600 that includes a processor 602, a memory 604, and input/output ports 610 operably connected by a bus 608. In one example, the computer 600 may include a test data logic 630 configured to produce test data for a de-duplicator, where the test data is reproducible, random, and contains configurable user-defined sequences. The test data logic 630 can operate multiple populators and multiple writers in parallel to facilitate producing test data at a rate sufficient to stress the de-duplicator. Data produced by test data logic 630 can be provided directly to the de-duplicator without being stored in a long term data storage device. In different examples, the logic 630 may be implemented in hardware, software, firmware, or combinations thereof. While the logic 630 is illustrated as a hardware component attached to the bus 608, it is to be appreciated that in one example, the logic 630 could be implemented in the processor 602.

Logic 630 may provide means (e.g., hardware, software, firmware) for controlling redundancy in a data set as the data set is being produced. Logic 630 may also provide means (e.g., hardware, software, firmware) for inserting user-defined sequences in the data set as the data set is being produced. Logic 630 may also provide means for controlling variability in the redundancy and the user-defined sequences as the data set is being produced. Logic 630 may also provide means for producing the data set and for providing the data set to a data de-duplicator for purposes including, but not limited to, testing purposes, as the data set is being produced and without storing the data set.

The means associated with logic 630 may be implemented, for example, as an ASIC programmed to perform this special purpose programming. The means may also be implemented as computer executable instructions that are presented to computer 600 as data 616 that are temporarily stored in memory 604 and then executed by processor 602.

Generally describing an example configuration of the computer 600, the processor 602 may be a variety of different processors including dual microprocessor and other multi-processor architectures. A memory 604 may include volatile memory or non-volatile memory. Non-volatile memory may include, for example, ROM, PROM, and other examples. Volatile memory may include, for example, RAM, SRAM, DRAM, and other examples.

A disk drive 606 or tape drive 622 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, or other device. Furthermore, the disk 606 may be a CD-ROM drive, a CD-R drive, a CD-RW drive, a DVD ROM drive, a Blu-Ray drive, an HD-DVD drive, or other drives. The memory 604 may store a process 614 or a data 616, for example. The disk 606 or the memory 604 may store an operating system that controls and allocates resources of the computer 600.

The bus 608 may be a single internal bus interconnect architecture or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and other devices. The input/output ports 610 may include, for example, serial ports, parallel ports, and USB ports.

The computer 600 can operate in a network environment and thus may be connected to the network devices 620 via the i/o interfaces 618, or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example apparatus, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the embodiment described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and similar combinations and permutations (e.g., the data store may store only A, only B, only C, A&B, A&C, B&C, A&B&C, A&A&A, A&A&B, A&A&B&B, A&A&B&B&C, A&A&B&B&C&C). It is not intended to require one of A, one of B, and one of C. When the applicants intend to indicate "at least one of A, at least one of B, and at least one of C", then the phrasing "at least one of A, at least one of B, and at least one of C" will be employed.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

What is claimed is:

1. A non-transitory computer-readable medium storing computer-executable instructions that when executed by a computer cause the computer to perform a method, the method comprising:

manipulating one or more redundancy parameters that control redundancy in data to be generated, where manipulating the one or more redundancy parameters includes manipulating a degree of internal redundancy for a subset of the data, a degree of external redundancy between subsets of the data, a frequency with which internal redundancy is to vary, or a frequency with which external redundancy is to vary;

manipulating one or more parameters that control custom-designed sequences to be included in the data, where manipulating the one or more parameters that control custom-designed sequences includes manipulating a sequence length distribution, where manipulating the sequence length distribution follows a kurtosis rule, where the kurtosis rule defines the sequence length distribution to follow a geometric frequency distribution;

generating the data based, at least in part, on the one or more redundancy parameters, where the data includes one or more variable custom-designed sequences, and where the data comprises one or more binary large objects exhibiting byte-sequence variability with binary large object dispersion, where the data include redundant spans that are specified as random seed generated variable length patterns from within a constrained number-space, and where the redundant spans are controlled, at least in part, by the redundancy parameters; and providing the data from the computer to a data de-duplicator, where manipulating the one or more redundancy parameters, manipulating the one or more parameters that control custom-designed sequences, generating the data, and providing the data are performed at least partially in parallel on the computer.

2. The non-transitory computer-readable medium of claim 1, where the method is performed in a multi-threaded system, where manipulating the one or more redundancy parameters and manipulating the one or more parameters that control custom-designed sequences are performed by one or more populator threads, where generating the data is performed by one or more writer threads, and where the one or more populator threads and the one or more writer threads are configured to operate in parallel in the multi-threaded system.

3. The non-transitory computer-readable medium of claim 2, the method comprising:

controlling the number of populator threads used to perform the method, and controlling the number of writer threads used to perform the method.

4. The non-transitory computer-readable medium of claim 2, where the one or more populator threads share a common data generator, and where the common data generator is one of, a random number generator, a pseudo-random number generator, a checksum generator, and a hash generator.

5. The non-transitory computer-readable medium of claim 4, the method comprising:

stopping data generation by the common data generator;

storing a state to which the common data generator advanced while generating test data, and restarting data generation by the common data generator at a point controlled, at least in part, by the state.

6. The non-transitory computer-readable medium of claim 1, the method comprising:

selectively controlling the rate at which the data is provided to the data de-duplicator, where the rate is configurable up to a rate that will saturate the data de-duplicator.

7. The non-transitory computer-readable medium of claim 1, where providing the data from the computer to the data de-duplicator includes temporarily storing a portion of the data in a memory-based buffer in the computer.

* * * * *

UNITED STATES PATENT AND TRADEMARK OFFICE
CERTIFICATE OF CORRECTION

PATENT NO. : 8,983,916 B2  
APPLICATION NO. : 13/524450  
DATED : March 17, 2015  
INVENTOR(S) : Stoakes et al.

Page 1 of 1

It is certified that error appears in the above-identified patent and that said Letters Patent is hereby corrected as shown below:

In the Specification:

In Column 3, line 38, delete "a pre deter-" and insert --a pre-deter- --.

In Column 6, line 50, delete "thereof), Computer" and insert --thereof). Computer--.

In Column 12, line 10, delete "a use defined" and insert --a user defined--.

In Column 13, line 54, delete "Zip" and insert --zip--.

Signed and Sealed this  
Eleventh Day of August, 2015

Michelle K. Lee  
*Director of the United States Patent and Trademark Office*